UNITED STATES PATENT OFFICE.

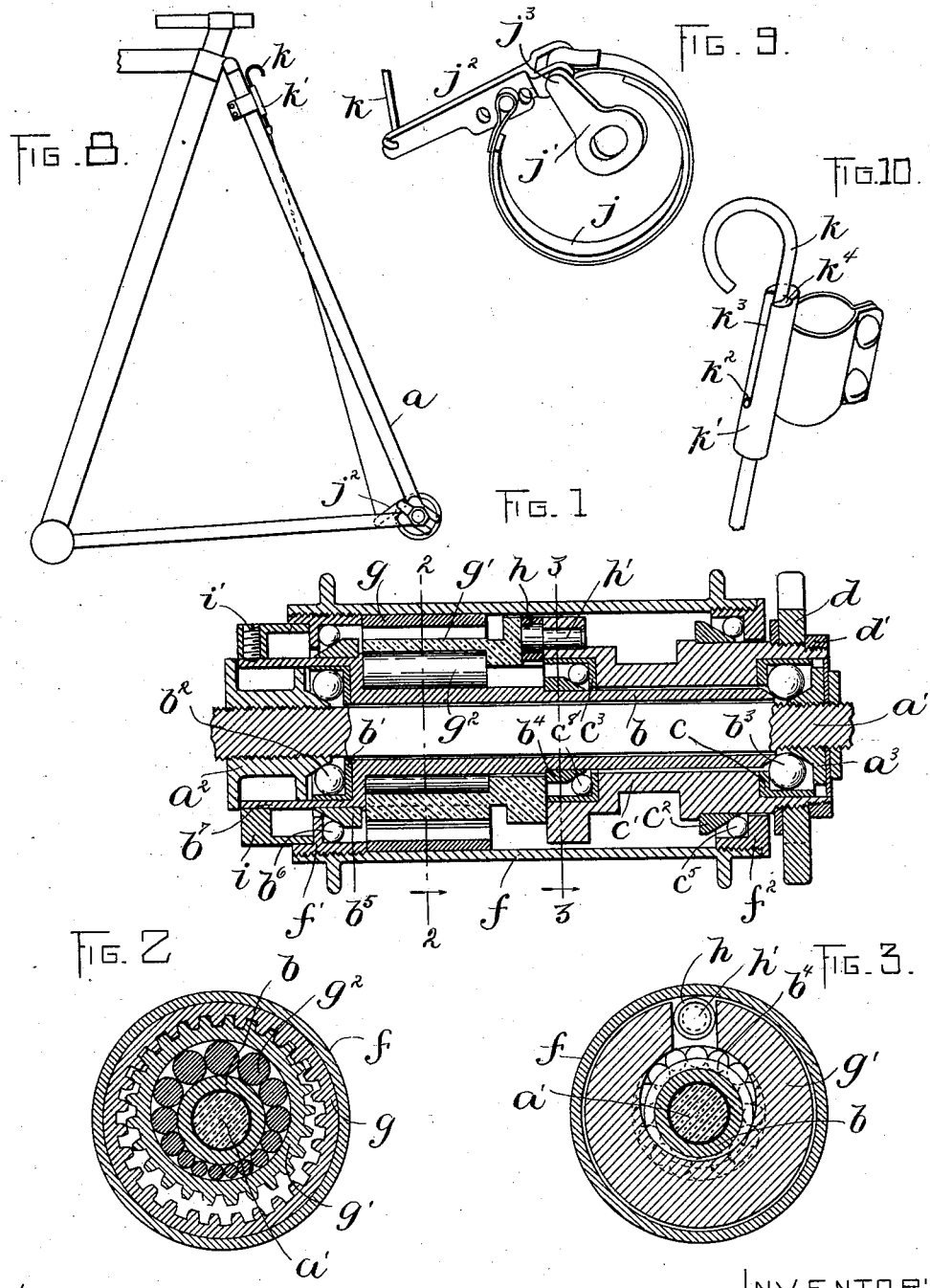

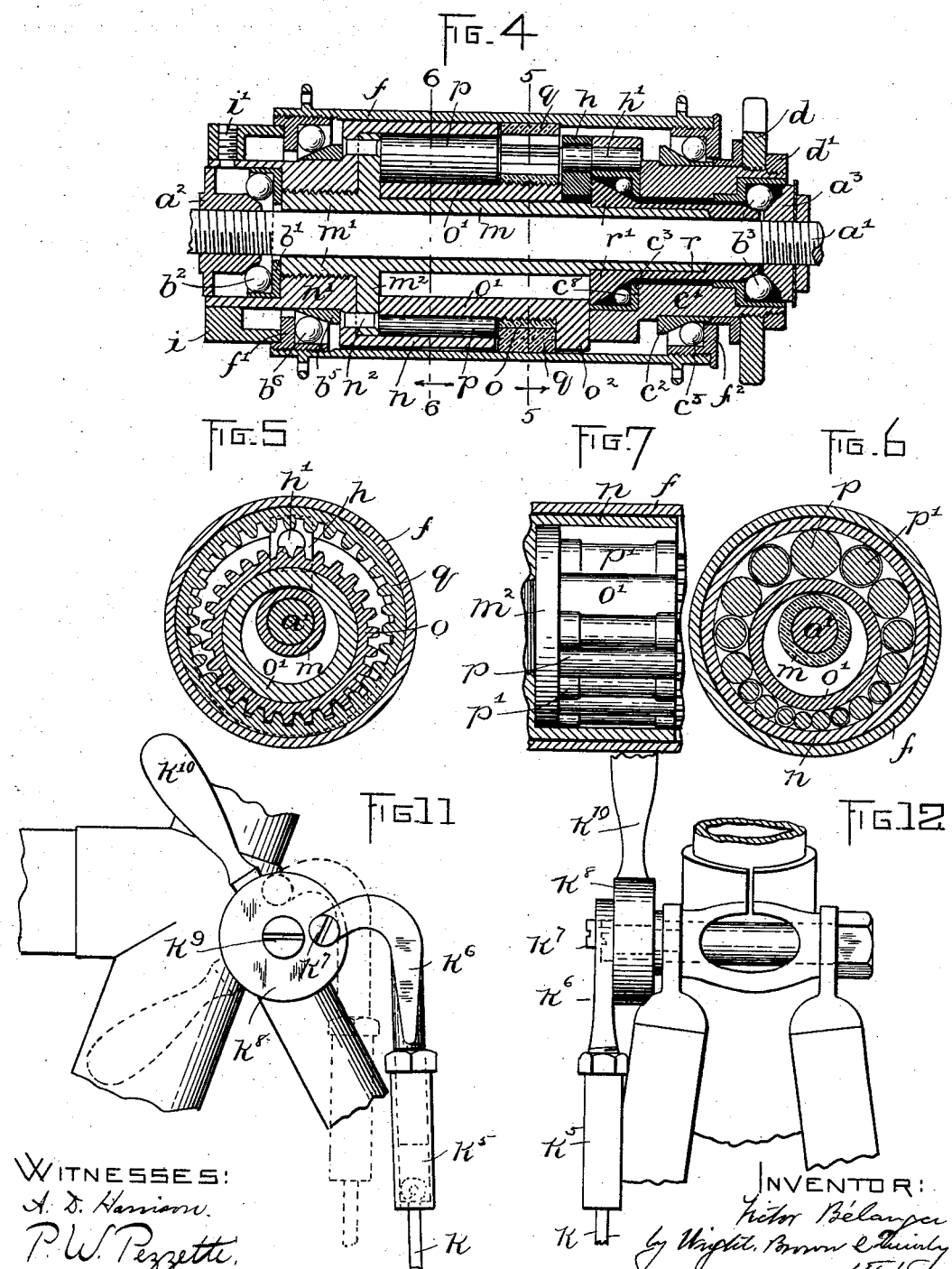

VICTOR BÉLANGER, OF BOSTON, MASSACHUSETTS, ASSIGNOR TO JOSIAH QUINCY, OF SAME PLACE.

MECHANICAL MOVEMENT FOR BICYCLES.

SPECIFICATION forming part of Letters Patent No. 605,844, dated June 21, 1898.

Application filed July 10, 1897. Serial No. 644,065. (No model.)

*To all whom it may concern:*

Be it known that I, VICTOR BÉLANGER, of Boston, in the county of Suffolk and State of Massachusetts, have invented certain new and useful Improvements in Mechanical Movements for Bicycles, of which the following is a specification.

This invention has relation to mechanical movements, and has for its object to provide a mechanism for transferring power from one rotatable member to another rotatable member, constructed in such way that the last-mentioned member may be driven at the same rate of speed as the first-mentioned member or at a slower rate of speed at will, whereby the greater amount of power may be imparted from the first member to the second member without a corresponding increase in the first-mentioned member.

In other words, the object of the invention is to provide an arrangement of gearing capable of being rotated or manipulated in such way that the initial power may be multiplied with but small loss of speed.

To these ends the invention consists of certain features of construction and relative arrangement of parts now to be described in the specification, illustrated upon the drawings, and more particularly pointed out in the appended claims.

Reference is to be had to the accompanying drawings, and to the letters marked thereon, forming a part of this specification, the same letters designating like parts or features, as the case may be, wherever they occur.

For the purpose of illustrating one embodiment of my invention I have shown it as being combined with the sprocket and hub of the rear wheel of a bicycle, in which—

Figure 1 represents a vertical longitudinal section through the hub of the rear wheel of a bicycle. Fig. 2 represents a transverse section on the line 2 2 of Fig. 1. Fig. 3 represents a similar section on the line 3 3 of Fig. 1. Fig. 4 illustrates in longitudinal section the preferred form of my device. Fig. 5 represents a cross-section on line 5 5 of Fig. 4. Fig. 6 represents a similar section on the line 6 6 of Fig. 4. Fig. 7 illustrates in side elevation the bearing-sleeve and the rolls, two of the rolls being removed. In this figure the outer bearing and the hub are shown in section. Fig. 8 illustrates the rear portion of the frame of the bicycle, showing the manner of operating the brake. Fig. 9 shows in perspective one form of brake which I employ. Fig. 10 represents in perspective one form of lock for the brake, and Figs. 11 and 12 illustrate another form of lock which I usually prefer to employ.

Of the drawings, $a$ $a$ indicate the rear forks of a bicycle, in which is rigidly secured the spindle $a'$, having bearing-cones $a^2$ $a^3$, which are threaded thereon, so as to be adjustable toward and from each other and being locked under normal conditions by lock-nuts in the usual way.

$b$ indicates a bearing-sleeve which is enlarged at one end and provided with an angular bearing-ring $b'$, between which and the cone $a^2$ is placed a series of antifriction-balls $b^2$. The opposite end of the sleeve is held in place by a series of antifriction-balls $b^3$, held against the cone $a^3$ by a bearing-ring $c$, inserted in a sleeve $c'$ and having a cone $c^2$.

The enlarged end of the sleeve $c'$ is externally threaded to receive a sprocket-wheel $d$, to which power is applied from the crank-shaft in any suitable or desired way, said wheel being held in place by a lock-nut $d'$, so that when the said sprocket-wheel is revolved it carries with it the sleeve $c'$. The said sleeve $b$ is provided with a bearing-ring or cone $b^4$, and the sleeve $c'$ is provided with angular bearing-rings $c^3$, so that the said sleeve $c'$ is mounted at both ends upon antifriction-balls $c^3$ $b^3$.

Upon the enlarged end of the sleeve $b$ is placed a bearing-ring or cone $b^5$, which is arranged oppositely to the cone or bearing-ring $c^2$ on the enlarged end of the sleeve $c'$. The hub $f$ of the rear wheel is internally threaded at its ends to receive adjustable angular bearing-rings $f'$ $f^2$, which are arranged with relation to the cones $b^5$ $c^2$, so as to receive between them antifriction-balls $b^6$ $c^5$, as shown in Fig. 1.

The sleeve $b$ extends practically the entire length of the hub $f$, while the superposed sleeve $c'$ projects only half-way between the ends of the hub.

Secured to the inner wall of the hub $f$, at the left-hand end thereof, is the internally-toothed ring $g$, with which intermeshes an externally-toothed ring $g'$, held in its eccentrical arrangement by a series of antifriction-rollers $g^2$, inserted between it and the bearing-surfaces on the sleeve $b$, the said antifriction devices being of different diameters or graded, as shown in Fig. 2.

The ring $g'$ is enlarged at its right-hand end and is provided with a groove or socket to receive a roller $h$, mounted upon the end of a pin $h'$, projecting forward from the end of the sleeve $c'$, so that the said sleeve and the eccentrically-arranged ring $g'$ are loosely connected together, whereby the rotation of the sleeve $c'$ will cause a corresponding rotation of the ring $g'$.

Upon the end $b^7$ of the sleeve $b$, which projects beyond the hub, is placed a hub or wheel $i$, rigidly secured thereto, as by a screw $i'$. (Shown in Fig. 1.) About this hub $i$ is passed the friction-strap $j$ of a brake device, the said device also comprising an arm $j'$, loosely mounted upon the end of the spindle $a'$, and a lever $j^2$, pivoted at $j^3$ to the end of the arm $j'$, the strap being secured to the end of the lever $j^2$, with its other end attached thereto at a point intermediate of the ends of the said lever. The rod or wire $k$ extends from the end of a lever $j^2$ through a guide $k'$, mounted upon one of the rear forks $a$, and is provided with a pin $k^2$, sliding in a slot $k^3$ in said guide. By drawing upon the end of the rod or wire $k$ the lever $j^2$ draws the brake-strap $j$ tightly around the hub $i$, so as to hold it and the sleeve $b$ against rotation, the rod $k$ being held in this position by partially turning it, so as to lie in the cross-slot $k^4$ at the end of the slot $k^3$. Under normal conditions the brake-strap is not clamped against the hub $i$, so that the sleeve $b$ is free to rotate, and hence the rotation of the sprocket-wheel $d$ causes the rotation of the sleeve $g'$ about the axis of the spindle $a'$, so as to carry with it the hub $f$, by reason of the toothed ring being in engagement with the gear $g$, forming a part of or secured to the said hub $f$. Under these conditions the hub $f$ will be rotated at the same rate of speed as the sprocket-wheel $d$.

In Figs. 11 and 12 I have illustrated the preferred form of lock for the rod or wire $k$, which holds the brake-strap clamped against the hub $i$. In these figures the end of the rod $k$ is secured to a sleeve $k^5$, threaded on a bent hook-shaped member $k^6$. The end of this member is connected by a pivot $k^7$ with a disk $k^8$, revoluble about a stud $k^9$ and having a handle $k^{10}$. When the handle is in the position shown in Fig. 11, the brake-strap is loose; but when it is turned into the position in dotted lines in that figure the pivot $k^7$ is at a dead-center with the stud $k^9$, and the brake-strap is locked about the hub $i$.

When it is desired to decrease the speed of the hub and increase the power for rotating it, the brake-strap is clamped about the hub $i$, so as to hold it and the sleeve $b$ against rotation. Thereupon the rotation of the sleeve $c'$ causes the eccentrically-arranged ring $g'$ to rotate upon its own axis and to rotate, by reason of its intermeshing with the gear $g$, the hub $f$ at a slower rate of speed with increasing power. Thus it will be seen that a bicycle-rider may greatly increase the power transmitted from the sprocket-wheel to the hub of the driving-wheel of the bicycle without very materially lessening its speed of rotation by means of the brake, which is easily controllable even while the bicycle is traveling rapidly.

In Figs. 4 to 7, inclusive, I have illustrated another embodiment of my invention, which for some purposes and reasons is preferable to that illustrated in Figs. 2 and 3. Upon the spindle $a'$ is placed the sleeve $m$, having the threaded end $m'$ and the annular flange $m^2$. The bearing-sleeve $n$ is cup-shaped and is provided with a partially hollow hub $n'$, which is screwed on the threaded portion $m'$ of the sleeve $m$, after which it is secured to the flange $m^2$ by rivets $n^2$. The externally-toothed ring $o$ is threaded upon a sleeve $o'$, which is telescoped in the bearing-ring $n$ and which is provided with a flange $o^2$, against which the toothed ring $o$ abuts. The sleeve $o'$ is eccentric with relation to the sleeve $m$ and the bearing-ring $n$ and is held in its eccentric relationship by the antifriction devices $p$ $p$, placed between the bearing-ring $n$ and the sleeve $o'$. These antifriction devices are of varying diameter, as heretofore described, and they are spaced apart by loose idlers $p'$ $p'$, which are smaller in diameter, so as not to bear against both the sleeve and the bearing-ring. These idler-rolls operate to decrease the friction which would be experienced if the rolls were all in contact, as shown in Fig. 2, and they may be cut away between their ends, as shown in Fig. 7. The externally-toothed ring $q$, with which the eccentric ring $o$ engages, is secured in the hub $f$ in any desirable way.

Upon the end of the sleeve $m$ is rigidly secured a sleeve $r$, which forms a continuation thereof and which is beveled to provide cones for the antifriction-balls $b^3$ $c^3$. By forming the sleeve $r$ separately it may be of harder steel than the sleeve $m$. The sleeve $c'$ is provided with a pin $h'$ and block $h$, which extends into the slot in the toothed ring supporting the sleeve $o'$. Except as hereinbefore described the mechanism is similar to that illustrated in Fig. 1, and hence I shall not describe again the other parts, which are similar to those in said last-mentioned figure.

Of course it will be understood that while I have chosen to illustrate my invention as being employed in connection with a bicycle, yet I do not limit myself to such adaptation, as there are many other uses to which the invention may be put.

I claim—

1. A mechanical movement comprising an outer hub or wheel having inwardly-projecting gear-teeth, an eccentrically-arranged externally-toothed ring meshing with the internal teeth on the hub or wheel, antifriction rollers or balls having graded diameters for sustaining the toothed ring in its eccentrical arrangement, and means controllable at will for causing said ring to revolve on its own axis or else on the axis of the said hub.

2. A mechanical movement comprising a stationary spindle, a bearing-sleeve rotatable about said spindle, a hub arranged concentrically with relation to the spindle and sleeve, and internally toothed, an eccentrically-arranged externally-toothed ring intermeshing with the internal teeth on the hub, antifriction devices of graded diameters for supporting said ring by said bearing in its eccentrical arrangement, a sprocket-wheel, means for imparting power from said sprocket-wheel to said ring, and a brake for intermittingly holding said bearing-sleeve stationary.

3. A mechanical movement comprising a stationary spindle, a sleeve rotatable relatively to said spindle, antifriction devices inserted between said sleeve and said spindle, an eccentrically-arranged toothed ring, antifriction devices of graded or varying diameters for supporting said ring by said bearing in its eccentric arrangement, a rotatable hub, internally toothed and intermeshing with the eccentrical ring, a sprocket-wheel, means for connecting the sprocket-wheel with the toothed ring, antifriction devices between the said hub and the said sleeve, and a brake for intermittingly holding said sleeve against rotation.

4. A mechanical movement comprising a hub having internal gear-teeth, an eccentric externally-toothed ring intermeshing with the gear-teeth, an eccentric sleeve to which said toothed ring is secured, means for driving said eccentric sleeve, a bearing sleeve or ring concentric with the hub and surrounding the eccentric sleeves, means for holding said bearing-sleeve stationary temporarily and antifriction devices having varying diameters and interposed between said sleeves.

5. A mechanical movement comprising a hub having internal gear-teeth, an eccentric externally-toothed ring intermeshing with the gear-teeth, a sleeve concentric with the hub and extending through the toothed ring and having a flange, a bearing ring or sleeve concentric with the first-named sleeve and secured to said flange, antifriction devices having varying diameters and interposed between the toothed ring and the said second-named bearing ring or sleeve, and means for locking said first-mentioned sleeve or ring against movement.

6. A mechanical movement comprising a bicycle-hub having internal gear-teeth, a sprocket-wheel, an eccentric toothed ring intermeshing with the said gear-teeth and connected with the sprocket, a brake-wheel having a bearing-sleeve concentric with the hub, graded antifriction rollers or balls inserted between said bearing-sleeve and said toothed ring, and spacing graded rolls arranged alternately with the antifriction devices.

7. A mechanical movement including a toothed gear, an eccentric toothed ring intermeshing therewith, a bearing-ring concentric with the toothed gear, means for holding said ring stationary, antifriction-rolls having varying diameters for holding said ring in its eccentric relationship, and reduced rolls $p'$ for spacing the antifriction-rolls.

In testimony whereof I have signed my name to this specification, in the presence of two subscribing witnesses, this 22d day of May, A. D. 1897.

VICTOR BÉLANGER.

Witnesses:
A. D. HARRISON,
P. W. PEZZETTI.